(12) United States Patent
Kawano

(10) Patent No.: US 10,036,354 B2
(45) Date of Patent: Jul. 31, 2018

(54) INTAKE APPARATUS OF INTERNAL COMBUSTION ENGINE

(71) Applicant: MAHLE FILTER SYSTEMS JAPAN CORPORATION, Tokyo (JP)

(72) Inventor: Takashi Kawano, Kawagoe (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 0 days.

(21) Appl. No.: 15/240,151

(22) Filed: Aug. 18, 2016

(65) Prior Publication Data
US 2017/0058847 A1 Mar. 2, 2017

(30) Foreign Application Priority Data

Aug. 25, 2015 (JP) .................................. 2015-165324

(51) Int. Cl.
| | | |
|---|---|---|
| F02M 35/10 | (2006.01) | |
| B29C 65/08 | (2006.01) | |
| F02B 31/06 | (2006.01) | |
| F02D 9/16 | (2006.01) | |
| B29L 31/00 | (2006.01) | |
| B29C 65/00 | (2006.01) | |
| B29C 65/06 | (2006.01) | |

(52) U.S. Cl.
CPC ....... *F02M 35/10255* (2013.01); *B29C 65/08* (2013.01); *F02B 31/06* (2013.01); *F02D 9/16* (2013.01); *F02M 35/1036* (2013.01); *F02M 35/10078* (2013.01); *F02M 35/10085* (2013.01); *F02M 35/10321* (2013.01); *B29C 65/06* (2013.01); *B29C 66/1312* (2013.01); *B29C 66/30223* (2013.01); *B29C 66/322* (2013.01); *B29C 66/543* (2013.01); *B29L 2031/7492* (2013.01); *F02B 2275/48* (2013.01); *Y02T 10/125* (2013.01); *Y02T 10/146* (2013.01)

(58) Field of Classification Search
CPC ................. F02M 35/104; F02M 35/10; F02M 35/10072; F02M 35/10032; F02M 35/1036; F02M 35/10098; F02M 35/048
See application file for complete search history.

(56) References Cited

U.S. PATENT DOCUMENTS

| | | | |
|---|---|---|---|
| 5,813,380 A | 9/1998 | Takahashi et al. | |
| 6,427,975 B1 * | 8/2002 | Powell | F02D 9/104 251/305 |

(Continued)

FOREIGN PATENT DOCUMENTS

| | | |
|---|---|---|
| EP | 1 452 723 A2 | 9/2004 |
| EP | 2 835 525 A1 | 2/2015 |
| JP | 2015-001196 A | 1/2015 |

OTHER PUBLICATIONS

Extended European Search Report, dated Jan. 19, 2017, 10 pages.

*Primary Examiner* — Long T Tran
(74) *Attorney, Agent, or Firm* — Foley & Lardner LLP

(57) ABSTRACT

A valve body unit (11) in which a plurality of valve bodies (17) which open and close intake passages (10) are attached on a rotational shaft (16) is inserted into inner sides of housing passages (28) of a housing (12) and, thereafter, a holder (13) is mounted in the housing (12) to rotatably support the valve body unit (11). A flange (14) is fixed onto an upper surface of the housing (12) on the holder (13) by means of a vibration welding and the holder (13) is retained with this flange (14) and the housing (12).

6 Claims, 4 Drawing Sheets

(56) References Cited

U.S. PATENT DOCUMENTS

| | | | | |
|---|---|---|---|---|
| 6,598,575 | B2* | 7/2003 | Minegishi | F02B 27/02 |
| | | | | 123/184.55 |
| 6,763,802 | B1* | 7/2004 | Brassell | F02B 23/08 |
| | | | | 123/184.61 |
| 6,895,926 | B1 | 5/2005 | Moreau et al. | |
| 7,121,246 | B2 | 10/2006 | Uchiyama | |
| 7,341,036 | B2* | 3/2008 | Akagawa | F02D 9/1095 |
| | | | | 123/184.53 |
| 7,624,715 | B2 | 12/2009 | Goldin et al. | |
| 7,789,066 | B2* | 9/2010 | Torii | F16K 1/2042 |
| | | | | 123/336 |
| 2002/0073961 | A1* | 6/2002 | Tanaka | F02D 9/101 |
| | | | | 123/336 |
| 2004/0112322 | A1 | 6/2004 | Corduan | |
| 2005/0016487 | A1 | 1/2005 | Ikuma et al. | |
| 2007/0017468 | A1 | 1/2007 | Letourneau et al. | |
| 2007/0028891 | A1 | 2/2007 | Akagawa | |
| 2007/0051913 | A1* | 3/2007 | Torii | F02D 9/1025 |
| | | | | 251/305 |
| 2007/0144483 | A1* | 6/2007 | Torii | F02D 9/103 |
| | | | | 123/337 |
| 2012/0298064 | A1* | 11/2012 | Brand | F02M 35/10078 |
| | | | | 123/184.61 |
| 2015/0267654 | A1* | 9/2015 | Kato | F02B 27/008 |
| | | | | 123/184.56 |
| 2016/0265473 | A1* | 9/2016 | Jiang | B23K 20/12 |

* cited by examiner

CYLINDER HEAD

INTAKE APPARATUS OF INTERNAL COMBUSTION ENGINE

BACKGROUND OF THE INVENTION (1) Field of the Invention

The present invention relates to an intake apparatus of an internal combustion engine in which a valve body unit configured to open and close a plurality of intake passages of the internal combustion engine is equipped.

(2) Description of Related Art

A Japanese Patent Application First Publication No. 2015-001196 published on Jan. 5, 2015 exemplifies a previously proposed intake apparatus which simultaneously opens and closes respective intake passages through a multiple string valve body unit (a valve body assembly) in which the intake passages for respective cylinders are arranged multiple side-by-side (juxtaposed) in a predetermined direction and valve bodies are mounted on a rotational shaft traversing these plurality of intake passages, as an intake control valve which forms a gas flow such as a tumble flow or a swirl flow within each combustion chamber of an internal combustion engine.

Each valve body unit is inserted into an inner side of a housing passage penetrated through a housing as a part of the intake passages. After this insertion, a holder is further mounted on the inner side of the housing passage from above of each valve body so that a corresponding valve body unit is rotatably supported between the housing and the holder. A side surface of the housing on which the holder is mounted is fixed to a side surface of a cylinder head to which the intake port is opened and a gasket to secure a sealing characteristic is intervened between both of the housing and the cylinder head.

SUMMARY OF THE INVENTION

In the way described above, the holder is mounted from above of the corresponding valve body unit and the corresponding valve body unit is inserted with the holder and the housing so as to be rotatably supported. In this structure, the corresponding valve body unit is inevitably positioned in a proximity of the side surface of the housing. Hence, a degree of freedom off the position of the valve body unit is low.

In addition, since the holder has a function as a bearing which rotatably supports the valve body unit together with the housing, the holder cannot be fixed onto the housing by means of a vibration welding. Hence, it is necessary to fix the holder to the housing using fixtures such as a plurality of screws, for example, as described in the previously proposed intake apparatus exemplified in the above-described Japanese Patent Application. In this case, working man-hours and a number of components are increased.

Or, as a structure omitting the fixtures of the holder, it can be thought that the holder is interposed between the housing and the cylinder head to hold the holder. However, if a gasket is disposed at a holder side which is not fixed to the housing, a sealing characteristic becomes a problem. In addition, the holder is mounted at the inner side of the housing passage in the proximity of the side surface of the housing on which the holder is mounted. Accordingly, a passage cross sectional area of the housing passage is larger than that of the intake passage. Therefore, in a case where the gasket is disposed at the housing side, it is necessary to dispose the gasket on a surrounding of the housing passage formed to be larger than the intake passage. Usually, the gasket is designed to form a sequential seal line at the surrounding of the intake passage. Hence, a special shape gasket large-sized with respect to a generally available gasket is resulted and is not established depending upon a shape and a layout of the cylinder head which is the other party side intake component.

With such circumstances as described above in mind, it is an object of the present invention to provide a novel intake apparatus of an internal combustion engine in which fixtures such as screws to fix a holder to a housing becomes unnecessary and a degree of freedom of a position of a valve body unit is high, while a degree of freedom of a seal line such as a gasket interposed between an intake component such as a cylinder head and a flange to seal an intake passage (an intake port) is improved.

The above-described object can be achieved by providing an intake apparatus of an internal combustion engine, comprising: a valve body unit including a rotational shaft traversing a plurality of intake passages juxtaposed in a predetermined direction and a plurality of valve bodies which open and close the intake passages in association with a rotation of the rotational shaft; a housing through which a plurality of housing passages which constitute a part of the plurality of intake passages are penetrated; and a holder mounted on the housing via the valve body unit and which rotatably supports the valve body unit together with the housing, wherein the holder is mounted on more inner sides of the respective housing passages than one of side surfaces of the housing, one ends of the respective housing passages being opened to the side surfaces of the housing, and a flange is fixed to the one of the side surfaces of the housing on which the holder is mounted, retains the holder together with the housing, and through which flange passages continued to the plurality of housing passages are penetrated.

In this way, since the flange which is a separate component from the holder having a bearing function of the valve body unit, this flange can be fixed to the housing by means of, for example, a simple fixation technique such as a vibration welding. In addition, the holder is held between this flange and the housing so that fixtures such as screws or bolts to fix the holder to the housing become unnecessary.

Furthermore, since the flange is provided, the degree of freedom of the position of the valve body unit related to a passage elongated direction becomes high. Therefore, for example, in a case where this intake apparatus is fixed to a side surface of the intake component such as the cylinder head, the flange is interposed between the housing and the cylinder head so that a space in the proximity of the side surface of the cylinder head is secured so as to avoid interference against other components, and a vehicle mountability can be improved.

Each flange passage penetrated through an inside of the flange is, for example, a passage cross sectional shape of the flange passage becomes gradually varied as a corresponding one of the flange passages is directed from one side of the passage elongated direction to the other side. Hence, even in a case where a cross sectional shape of each of the intake passages opened to the side surface of the housing at which the holder is mounted is different from the cross sectional shape of a corresponding one of the intake passages (intake port) opened to the side surface of another intake component such as the cylinder head to which the flange is fixed, both of the flange and the cylinder head can smoothly be connected together without a level difference by means of the corresponding one of the flange passages whose cross sectional shape is varied in the passage elongate direction.

The other intake component such as the cylinder head is fixed to the side surface of the flange which is opposite to the housing. The gasket is interposed between both of the flange and the cylinder head. Since another component such as the holder is absent at the side surface of the anti-housing side of this flange, a limitation (a restriction) is not received on the shape and the layout of the gasket.

DETAILED DESCRIPTION OF THE INVENTION

Hereinafter, a preferred embodiment of an intake apparatus of an internal combustion engine according to the present invention will be described on a basis of attached drawings in order to facilitate a better understanding of the present invention.

Figure 1:
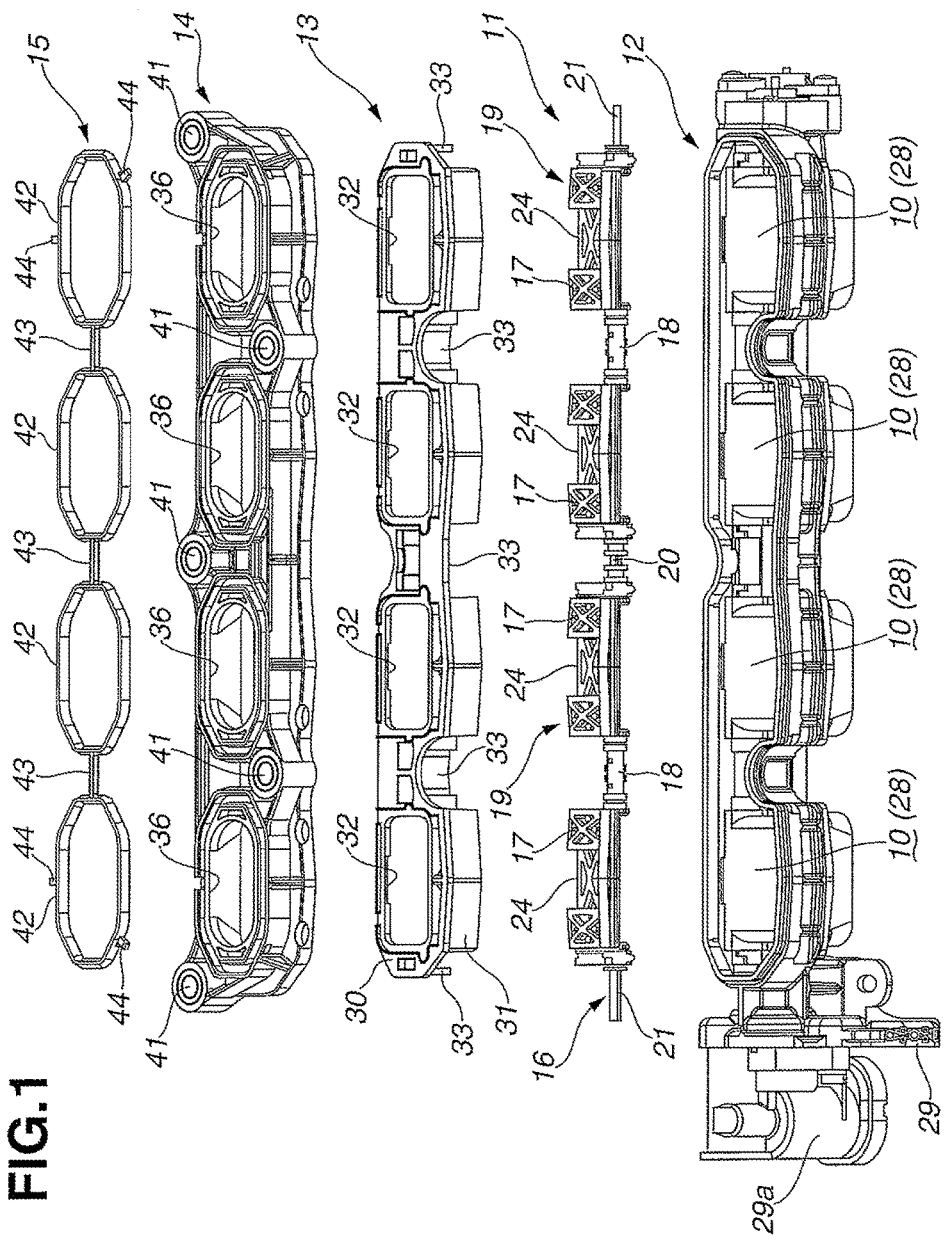
FIG. 1 is an exploded perspective view of an intake apparatus of an internal combustion engine related to a preferred embodiment according to the present invention.
Figure 2:
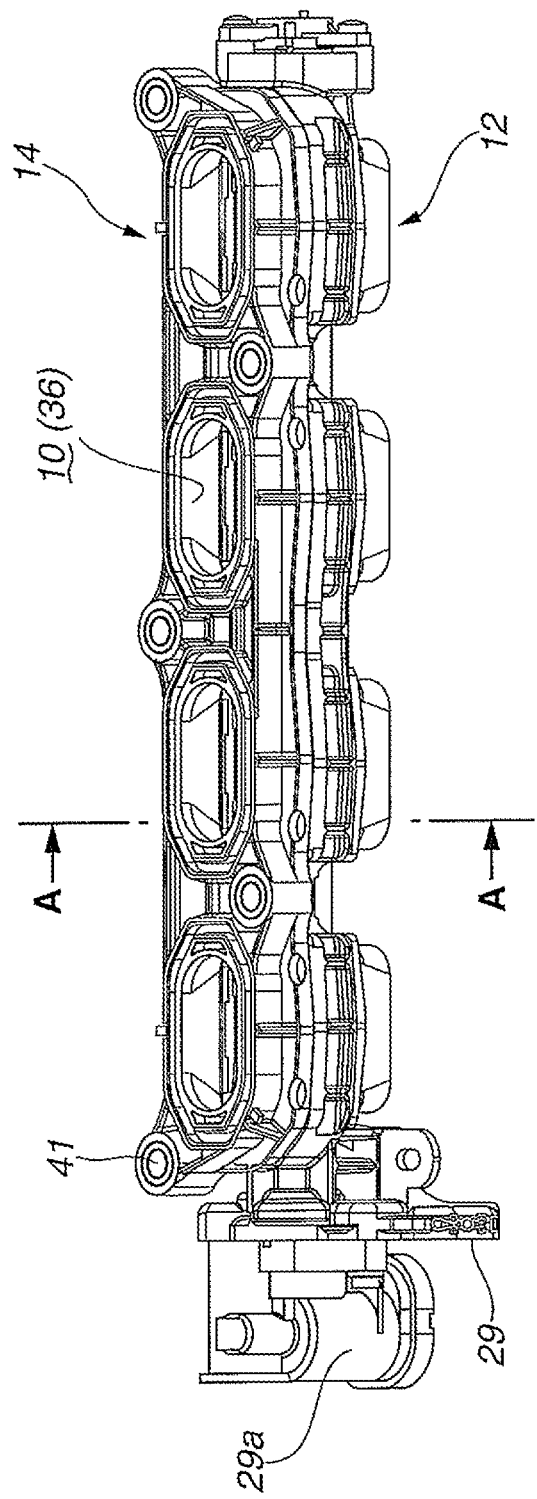
FIG. 2 is a perspective view representing the above-described intake apparatus.
Figure 3:
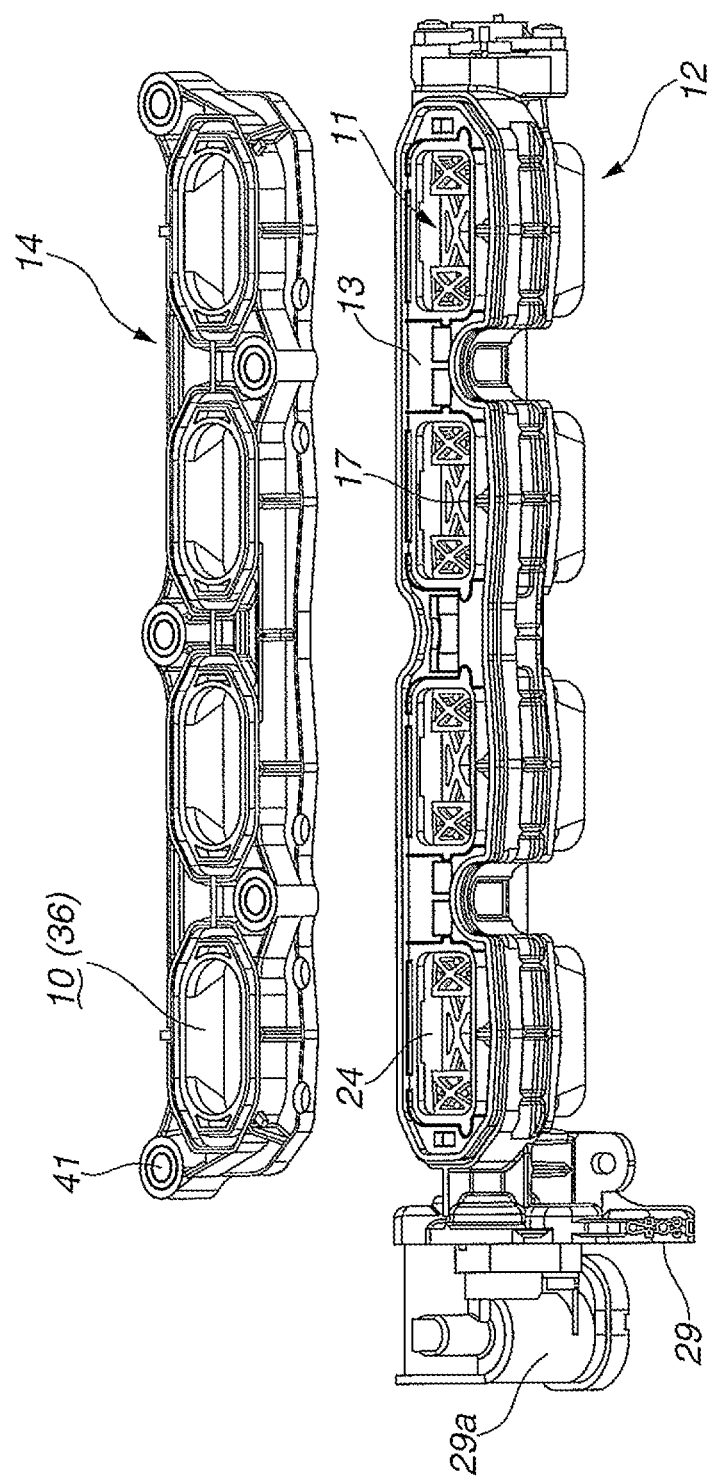
FIG. 3 is an exploded perspective view representing the above-described intake apparatus.

FIGS. 1 through 4 show a tumble control apparatus of an in-line four-cylinder internal combustion as the preferred embodiment of the intake apparatus of the internal combustion engine according to the present invention. It should be noted that FIG. 2 is a perspective view of the tumble control apparatus after an assembly of the tumble control apparatus shown in FIG. 1 and FIG. 3 is an exploded perspective view representing a state immediately before a flange 14 is fixed to a housing 11 by means of a vibration welding.

This tumble control apparatus constitutes a part of an intake manifold. This tumble control apparatus is attached onto a side surface of an intake side at which four intake ports for respective cylinders in a cylinder head (not shown) are opened. This tumble control apparatus is penetrated and formed in a posture in which four intake passages 10 connected to and communicated with the above-described intake ports are arranged side-by-side in a cylinder bank direction (corresponds to "a predetermined direction" described in claims). This tumble control apparatus is approximately constituted by a valve body unit 11, a housing 12, a holder 13, a flange 14, and a gasket 15.

Valve body unit 11 has, basically, the same structure as described in the Japanese Patent Application First Publication No. 2015-001196. Simply explained, valve body unit 11 includes: a rotational shaft 16 extended in the cylinder bank direction so as to traverse four intake passages 10; and four valve bodies 17 attached onto this rotational shaft 16 and which open and close respective intake passages 10 in association with a rotation of rotational shaft 16. Two adjacent valve bodies 17 and a bar-shaped linkage bar 18 linking both valve bodies 17 are integrally formed as a synthetic resin made single component 19. A metallic linkage shaft 20 of a rectangular shape in cross section serves to link between two synthetic resin made components 19. Metallic auxiliary rotational shafts 21 of rectangular shapes in cross sections are fixed to both sides of linked two components 19. These linkage bars 18, linkage shaft 20, and auxiliary rotational shafts 21 constitute above-described rotational shaft 16 arranged on the same axial line along the cylinder bank direction.

Figure 4:
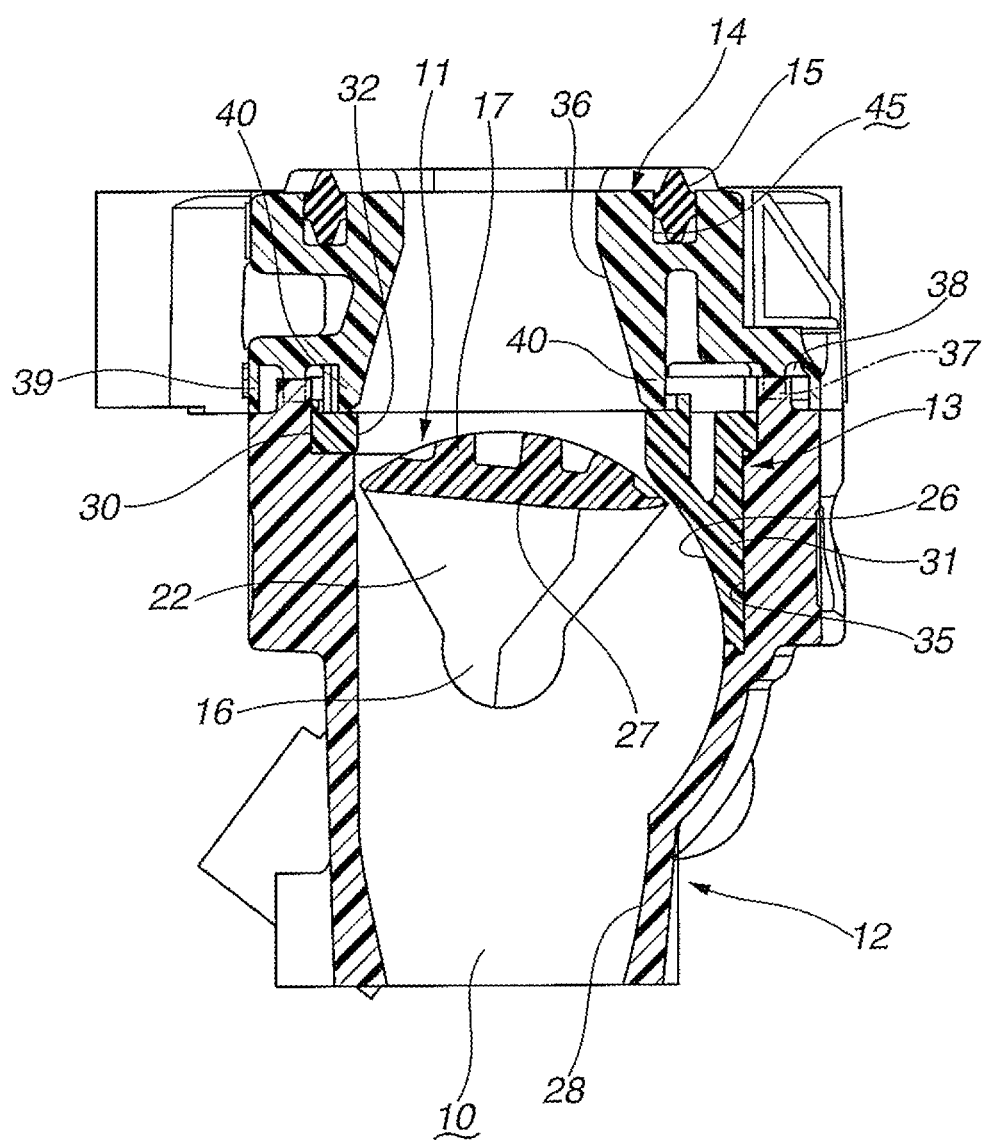
FIG. 4 is a cross-sectional view cut away along a line A-A in FIG. 2.

Each valve body 17 is disposed and offset in a crank shape toward a radial direction with respect to a shaft center of rotational shaft 16 and an outer peripheral surface of each valve body 17 forms a substantially arc surface and has a crescent shaped cross section. As shown in FIG. 4, a fan shaped arm section 22 is connected between each valve body 17 and rotational shaft 16. With reference to FIGS. 1 and 4, when valve body unit 11 is rotationally driven in an anti-clockwise direction by means of an actuator 29a, valve body unit 11 is pivoted in the anti-clockwise direction and each valve body 17 is held in an valve-closure posture. In this valve-closure posture, each valve body 17 becomes a posture such that each valve body 17 traverses so as to enclose a major part of intake passages 10 and at least one part of intake passages 10 is enclosed. It should be noted that an appropriate ventilation window 24 (refer to FIG. 1) is recessed at a center part of each valve body 17 to secure an appropriate intake air quantity, even in this valve-closure posture.

On the other hand, when valve body unit 11 is rotationally driven in a clockwise direction of FIG. 4 by means of actuator 29a, valve body unit 11 is pivoted in the clockwise direction and each valve body 17 is held in a valve-open posture. In this valve-open posture, almost whole of each valve body 17 is housed within housing 12 and a housing recess section 26 in a crescent shape recessed on holder 13 so that an inner peripheral surface 27 of each valve body 17 constitutes a part of intake passages 10. In this way, since the whole of each valve body 17 takes a form of taking refuge from intake passages 10, in this valve-open posture, a ventilation resistance is remarkably reduced.

Housing 12 constitutes an elongated box-shaped structure integrally formed of a hard synthetic resin material as a part of an intake manifold (not shown) and is penetrated in such a way that four housing passages 28 constituting part of intake passages 10 line up in the cylinder bank direction. An actuator attachment flange 29 onto which rotary type actuator 29a is attached is formed on one end of housing 12. Rotational shaft 16 of valve body unit 11 is rotationally driven by above-described actuator 29a and an operation of actuator 29a is controlled in accordance with an engine driving state by a control section (not shown).

Holder 13 is integrally formed of the hard synthetic resin material. Holder 13 is formed in a substantially letter L shape linking in a letter L shape between a horizontal piece section 30 and a vertical piece section 31. Four substantially rectangular window sections 32 continued on housing passages 28 are formed on horizontal piece section 30. This holder 13 is mounted in an inner side of housing passages 28 from the opening section of an upper surface (side surface) of housing 12 at which one end of housing passages 28 is opened, with valve body unit 11 inserted into an inside of housing 12. By this holder 13 and housing 12, valve body unit 11 is rotatably supported. On housing 12 and holder 13, bearing sections 33 which rotatably support parts of rotational shaft 16 of valve body unit 11 are intermittently disposed in an axial direction at plural locations.

Housing recession sections 35, each of which accords with the shape of holder 13, are recessed on housing passages 28 of housing 12. In a state in which holder 13 is mounted, as shown in FIG. 4, an inside wall surface of holder 13 is smoothly connected with an inner wall surface of each of housing passages 28 of housing 12 so as to constitute individual sequential intake passages 10.

Flange 14 is a member providing an essential part of this preferred embodiment. Flange 14 is integrally formed of the hard synthetic resin material in a plate-like shape having a predetermined thickness. Four flange passages 36 lined up in the cylinder bank direction are penetrated through flange 14. Flange passages 36 are smoothly connected with window sections 32 of holder 13 and housing passages 28 to constitute a part of intake passages 10. Flange 14 is joined and fixed on the upper surface side of housing 12 through the vibration welding at a lower surface side in FIG. 4. In this fixation state, holder 13 is grasped and held between flange 14 and housing 12.

In more details, a weld projection 37 for the vibration welding purpose is projected toward the housing side (a lower side in FIG. 4) from a lower surface side of flange 14. Grooves 38 into which a molten material is flowed are formed at both sides of this weld projection 37. This weld projection 37 is provided over a whole periphery of a peripheral edge section of flange 14. This weld projection 37 serves to join and fix flange 14 and housing 12 together over the whole peripheries of peripheral edge sections of flange 14 and housing 12. It should be noted that, at the lower surface side of flange 14, only a part of weld projection 37 is contacted and connected with housing side 12 and an outer peripheral wall 39 of flange 14 is opposed against an outer peripheral upper surface of housing 12 side via a slight gap. Similarly, an inner peripheral wall 40 of flange 14 is opposed against the upper surface of holder 13 via the slight gap. Hence, although flange 14 is, strictly speaking, not contacted on holder 13, a vertical movement in FIG. 4 of holder 13 is limited by means of inner peripheral wall 40 of flange 14 which is opposed against the upper surface of holder 13 and holder 13 is substantially held without movement between flange 14 and housing 12.

As shown in FIG. 4, each of flange passages 36 is formed to penetrate through an inside of flange 14 and a passage cross sectional shape of each of flange passages 36 becomes gradually varied such that, as each flange passage 36 becomes directed toward the upper side (cylinder head side) in FIG. 4 in the elongated direction of the passage, a passage cross sectional area becomes gradually smaller. In other words, in this embodiment, since a cross-sectional shape of each intake passage 10 which opens to the upper surface of housing 12 is different from the cross sectional shape of the intake port which opens to a side surface of the cylinder head, the cross sectional shape of each flange passage 36 which opens to the upper surface of flange 14 is conformed to the cross sectional shape of the intake port of the cylinder head according to each flange passage 36 whose cross sectional shape is gradually varied in the passage elongated direction so that both of the flange passage and the intake port are smoothly connected and communicated without a level difference.

An upper surface side of this housing 12 is jointly fastened and fixed to the intake-side side surface of the cylinder head to which four intake ports of the cylinder head (intake component) are opened via a seal purpose gasket 15 using a plurality of fixing bolts (not shown) as described above. A plurality of bolt holes 41 through which the above-described fixture bolts are inserted are disposed at appropriate intervals, on a peripheral edge of housing 12.

This gasket 15 is a component to secure a sealing characteristic of intake passages 10 and is designed to form a sequential seal line over the peripheral edge section of all intake passages 10. Specifically, as shown in FIG. 1, gasket 15 includes: four ring sections 42 enclosing a surrounding of intake passages 10; and three bar-shaped linkage sections 43 linking adjoining ring sections 42. In addition, four positioning projections 44 for positioning purpose with respect to flange 14 are projected from gasket 15 at four locations.

A gasket groove 45 housing a substantially lower half of gasket 15 is recessed on the upper surface of housing 12, as shown in FIG. 4. It should be noted that, since another component such as holder 13 is not present on the upper surface of flange 14 (a side surface at an opposite side of housing 12), a limitation on a shape and a layout of gasket 15 is not received and gasket 15 can be designed to conform to the shape of intake passages 10. Thus, a degree of freedom of the seal line by gasket 15 is high. On the contrary, in a conventional case where the gasket is disposed on the upper surface of housing 12 on which holder 13 is mounted, as shown in FIG. 4, holder 13 is positioned on the position of gasket 15. When gasket 15 is arranged on holder 13, holder 13 is not firmly fixed on housing 12. Thus, the sealing characteristic cannot be secured. If the gasket is tried to be disposed on the upper surface of housing 12, the gasket becomes a large size and the sealing characteristic is not established depending upon the shape of the other side cylinder head.

As described above, in this embodiment, flange 14 which is separate from holder 13 having the bearing function of valve body unit 11 is provided. Thus, it becomes possible to adopt a simple fixing method by the vibration welding and such fixtures as screws and bolts to fix holder 13 to housing 12 become unnecessary. Thus, a manufacturing man-hour cost and a number of components can accordingly be reduced. In addition, an improvement in productivity and a reduction of production cost can be achieved. Furthermore, since the other component such as holder 13 or so forth is not present on the upper surface of flange 14 attached on the cylinder head, the degree of freedom of the seal line by gasket 15 intervened between the cylinder head and flange 14 is improved.

In addition, since flange 14 is intervened between housing 12 and the cylinder head, it becomes possible to adjust the position of valve body unit 11 concerning the passage elongated direction depending upon a size of the flange 14 in the passage elongated direction and the degree of freedom of the position of valve body unit 11 becomes high. Hence, for example, even in a case where there is no spatial margin in the proximity of the intake-side side surface of the cylinder head, it becomes possible to dispose valve body unit 11 separately (away) from the cylinder head and a vehicle mountability can be improved.

According to the present invention, the degree of freedom of the seal line according to the gasket interposed between the intake component such as the cylinder head and the flange becomes high, the fixtures such as screws to fix the holder to the housing become unnecessary, and the degree of freedom of the position of the valve body unit becomes high.

This application is based on a prior Japanese Patent Application No. 2015-165324 filed in Japan on Aug. 25, 2015. The entire contents of this Japanese Patent Application No. 2015-165324 are hereby incorporated by reference. Although the invention has been described above by reference to certain embodiments of the invention, the invention is not limited to the embodiment described above. Modifications and variations of the embodiments described above will occur to those skilled in the art in light of the above teachings. For example, the present invention has been applied to the tumble control apparatus in the preferred embodiment. However, the present invention is, for example, applicable to the intake apparatus in which a multiple type throttle valve is equipped as the valve body unit.

The scope of the invention is defined with reference to the following claims.

What is claimed is:

1. An intake apparatus of an internal combustion engine, comprising:
   a valve body unit including a rotational shaft traversing a plurality of intake passages juxtaposed in a predetermined direction and a plurality of valve bodies which open and close the intake passages in association with a rotation of the rotational shaft;
   a housing through which a plurality of housing passages which comprise a part of the plurality of intake passages are penetrated; and
   a holder mounted on the housing via the valve body unit and which rotatably supports the valve body unit together with the housing,
   wherein the holder is mounted in an inner side of each of the housing passages from an opening section of one side surface of the housing at which one end of the housing passages is opened,
   wherein a flange is fixed to one of side surfaces of the housing on which the holder is mounted, and retains the holder together with the housing, and through which flange passages communicated to the plurality of housing passages are penetrated,
   wherein the flange is fixed to one of the side surfaces of the housing by a vibration weld,
   wherein a gasket is intervened between one of side surfaces of the flange which is opposite to the housing and another intake component fixed to the one of the side surfaces of the flange, and
   wherein a gasket groove is recessed in the one of the side surfaces of the flange and configured to house the gasket.

2. The intake apparatus of the internal combustion engine as claimed in claim 1, wherein a passage cross sectional shape of each of the flange passages becomes gradually varied as a corresponding one of the flange passages extends from one side of a passage elongated direction to another side of the passage elongated direction.

3. The intake apparatus of the internal combustion engine as claimed in claim 1, wherein the gasket includes:
   a plurality of ring sections enclosing respective surroundings of the intake passages;
   a plurality of linkage sections linking mutually adjacent ring sections; and
   a plurality of positioning projections structured to position the gasket with respect to the flange.

4. The intake apparatus of the internal combustion engine as claimed in claim 1, wherein the predetermined direction corresponds to a cylinder bank direction.

5. The intake apparatus of the internal combustion engine as claimed in claim 1, wherein the another intake component corresponds to a cylinder head.

6. The intake apparatus of the internal combustion engine as claimed in claim 1, wherein the gasket includes a plurality of positioning projections arranged to permit positioning with respect to the flange, the positioning projections being projected from the gasket.

* * * * *